United States Patent
Choi et al.

(10) Patent No.: US 12,526,942 B2
(45) Date of Patent: Jan. 13, 2026

(54) ROTATING DEVICE FOR ROTATING DISPLAY DEVICE AND CONTROL METHOD THEREOF

(71) Applicant: Samsung Electronics Co., Ltd., Suwon-si (KR)

(72) Inventors: Eunseok Choi, Suwon-si (KR); Kihyun Song, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 326 days.

(21) Appl. No.: 17/969,205

(22) Filed: Oct. 19, 2022

(65) Prior Publication Data

US 2023/0217618 A1 Jul. 6, 2023

Related U.S. Application Data

(63) Continuation of application No. PCT/KR2022/014891, filed on Oct. 4, 2022.

(30) Foreign Application Priority Data

Jan. 3, 2022 (KR) .................. 10-2022-0000478

(51) Int. Cl.
*H05K 5/02* (2006.01)
*G06F 1/16* (2006.01)
*H02P 8/00* (2006.01)

(52) U.S. Cl.
CPC ......... *H05K 5/0234* (2013.01); *G06F 1/1601* (2013.01); *H02P 8/00* (2013.01)

(58) Field of Classification Search
None
See application file for complete search history.

(56) References Cited

U.S. PATENT DOCUMENTS 9,545,723 B2 * 1/2017 Chang .................. B25J 9/1669
11,112,822 B2    9/2021 Choi
(Continued)

FOREIGN PATENT DOCUMENTS

| CN | 112104916 A | 12/2020 |
|----|-------------|---------|
| JP | 2005-109626 | 4/2005 |

(Continued)

OTHER PUBLICATIONS

International Search Report, PCT/ISA/210, dated Jan. 19, 2023, in PCT Application No. PCT/KR2022/014891.
(Continued)

*Primary Examiner* — Allen L Parker
*Assistant Examiner* — Christopher L Augustin
(74) *Attorney, Agent, or Firm* — STAAS & HALSEY LLP

(57) ABSTRACT

A rotating device on which different display devices are mountable, including a driving member configured to, with a respective display device mounted on the rotating device, rotate the display device, a memory storing a plurality of driving information for controlling the driving member, and a processor configured to, with the respective display device mounted on the rotating device, and based on receiving a user command for rotating the display device, control the driving member to rotate the display device based on driving information of the plurality of driving information stored in the memory that corresponds to identification information of the display device received by the rotating device from the display device.

10 Claims, 11 Drawing Sheets

(56) References Cited

U.S. PATENT DOCUMENTS

| | | |
|---|---|---|
| 11,250,544 B2 | 2/2022 | Jang et al. |
| 11,340,651 B2 | 5/2022 | Lee et al. |
| 11,439,230 B2 | 9/2022 | Cho |
| 11,455,083 B2 | 9/2022 | Choi et al. |
| 2007/0209249 A1 | 9/2007 | Woo et al. |
| 2008/0036905 A1 | 2/2008 | Moon et al. |
| 2017/0131789 A1* | 5/2017 | Shim ................ G06F 3/023 |
| 2017/0278477 A1 | 9/2017 | Jeong et al. |
| 2020/0301469 A1* | 9/2020 | Choi ................ G06F 3/147 |
| 2020/0344439 A1* | 10/2020 | Choi ................ F16M 11/22 |
| 2020/0380935 A1 | 12/2020 | Ignaszewski et al. |
| 2021/0295470 A1* | 9/2021 | Meng ................ G06T 3/60 |
| 2021/0314520 A1* | 10/2021 | Yu .................. H04N 21/4438 |
| 2021/0318722 A1 | 10/2021 | Lee et al. |
| 2023/0213963 A1 | 7/2023 | Lee |

FOREIGN PATENT DOCUMENTS

| | | |
|---|---|---|
| KR | 10-0702603 | 4/2007 |
| KR | 10-2008-0092037 | 10/2008 |
| KR | 10-2017-0033818 | 3/2017 |
| KR | 10-2017-0054866 | 5/2017 |
| KR | 10-2017-0110965 | 10/2017 |
| KR | 10-2143083 | 8/2020 |
| KR | 10-2020-0111499 | 9/2020 |
| KR | 10-2020-0134869 | 12/2020 |
| KR | 10-2209787 | 1/2021 |
| KR | 10-2242031 | 4/2021 |
| KR | 10-2373510 | 3/2022 |
| WO | WO 2021/241777 A1 | 12/2021 |

OTHER PUBLICATIONS

Written Opinion, PCT/ISA/237, dated Jan. 19, 2023, in PCT Application No. PCT/KR2022/014891.

Office Action dated Dec. 2, 2024, in European Application No. EP 22 91 6310.

Office Action dated Oct. 14, 2025, in Korean Patent Application No. 10-2022-0000478.

* cited by examiner

ROTATING DEVICE FOR ROTATING DISPLAY DEVICE AND CONTROL METHOD THEREOF

CROSS-REFERENCE TO RELATED APPLICATIONS

This application is a continuation of International Application No. PCT/KR2022/014891 designating the United States, filed on Oct. 4, 2022, in the Korean Intellectual Property Receiving Office and claiming priority to Korean Patent Application No. 10-2022-0000478 filed on Jan. 3, 2022, in the Korean Intellectual Property Office, the disclosures of which are incorporated by reference herein in their entireties.

BACKGROUND

1. Field

The disclosure relates to a rotating device for rotating a display device and a control method for controlling the rotating device.

2. Description of Related Art

Recently, as electronic technologies have been developed, various electronic devices are being developed. In particular, recently, a display device including a rotatable display is being developed.

If a user command for rotation is input, a rotatable display device may rotate a display arranged in a horizontal state to a vertical state, or rotate a display arranged in a vertical state to a horizontal state.

A conventional rotatable display device has a structure wherein a display and a rotating device rotating the display are formed integrally, and was controlled by a method of setting a torque and a rotation speed for rotating the display according to information such as the size, the weight, etc. of the display.

However, according to users' need of connecting displays in various sizes to a rotating device and using them, there is a need to set a method of controlling the rotating device differently in consideration of the mechanical characteristics (the size, the weight, the location of the center of gravity, etc.) of the display connected to the rotating device.

SUMMARY

A rotating device on which different display devices are mountable according to an embodiment of the disclosure includes: a driving member configured to, with a respective display device mounted on the rotating device, rotate the display device; a memory storing a plurality of driving information for controlling the driving member; and a processor configured to, with the respective display device mounted on the rotating device, and based on receiving a user command for rotating the display device, control the driving member to rotate the display device based on driving information of the plurality of driving information stored in the memory that corresponds to identification information of the display device received by the rotating device from the display device. In this case, the rotating device may further include a communicator for communicating with the display device, and the processor may receive identification information for identifying the display device from the display device through the communicator, and determine the driving information corresponding to the display device based on the received identification information.

The rotating device may include a communicator, wherein the processor is configured to, with the respective display device mounted on the rotating device: receive, from the display device through the communicator, the identification information of the display device, and determine the driving information that corresponds to the received identification information.

The processor may be configured to, with the respective display device mounted on the rotating device: calculate a torque value for rotating the display device based on at least one of a size, a weight, a location of a center of gravity, and a rotational inertia, of the display device, included in the identification information, and determine the driving information that corresponds to the received identification information based on the calculated torque value.

The processor may be configured to, with the respective display device mounted on the rotating device: determine the driving information that corresponds to the received identification information such that a rotation speed of rotating the display device becomes lower as the torque value becomes bigger.

In this case, the plurality of stored driving information may include a speed profile for controlling the rotation of the motor, and the processor may control the rotation of the motor according to the speed profile included in the driving information corresponding to the display device mounted on the rotating device.

The driving member may include a step motor that transmits a rotational force to the display device.

The driving information that corresponds to the identification information of the display device may include a speed profile for controlling rotation of the step motor, and the processor may be configured to, with the respective display device mounted on the rotating device, control the rotation of the step motor according to the speed profile included in the driving information that corresponds to the identification information of the display device.

The identification information of the display may be determined according to the torque value for rotating the display device calculated based on at least one of a size, a weight, a location of a center of gravity, and a rotational inertia, of the display device.

A display device rotatably mountable on a rotating device according to an embodiment of the disclosure includes: a display; a communicator; and a processor configured to: determine identification information of the display device according to a torque value for rotating the display device calculated based on at least one of a size, a weight, a location of a center of gravity, and a rotational inertia, of the display device, and, when the display device is mounted on the rotating device, control the communicator to transmit the determined identification information to the rotating device.

The communicator may include: a first communication interface to communicate with a remote control device by a first communication method, and a second communication interface to communicate with the rotating device by a second communication method different from the first communication method.

The processor may be configured to: after receiving a user command for rotating the display device from the remote control device through the first communication interface, control the second communication interface to transmit the identification information to the rotating device.

The processor may be configured to: control the second communication interface to transmit, to the rotating device, a control signal for rotating a driving member included in the rotating device by a rotation speed corresponding to the identification information of the display device.

The identification information of the display device may be group information for a group that includes the display device, the torque value for rotating the display device may be calculated based on the group that includes the display device, and the processor may be configured to control the communicator to transmit the group information to the rotating device.

A method of controlling a rotating device on which different display devices are mountable, according to an embodiment of the disclosure includes, by the rotating device: controlling a driving member of the rotating device to rotate a respective display device mounted on the rotating device based on driving information, of a plurality of driving information stored in a memory of the rotating device, that corresponds to identification information of the display device received by the rotating device from the display device.

The method may further include, by the rotating device: receiving, from the display device, the identification information of the display device; and determining the driving information that corresponds to the received identification information.

Determining the driving information may include: calculating a torque value for rotating the display device based on at least one of a size, a weight, a location of a center of gravity, and a rotational inertia, of the display device, included in the received identification information, and determining the driving information that corresponds to the received identification information based on the calculated torque value.

In this case, in the step of determining the driving information, the driving information corresponding to the display device may be determined such that the rotation speed of rotating the display device becomes lower as the torque value becomes bigger.

Meanwhile, the driving member may include a motor transmitting a rotational force to the display device, and the motor may be a step motor.

In this case, the plurality of stored driving information may include a speed profile for controlling the rotation of the motor, and the step of controlling the driving member may include the step of controlling the rotation of the motor according to the speed profile included in the driving information corresponding to the display device mounted on the rotating device.

Meanwhile, the identification information may be determined according to the torque value for rotating the display device calculated based on at least one information among the size, the weight, the location of the center of gravity, or the rotational inertia of the display device.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
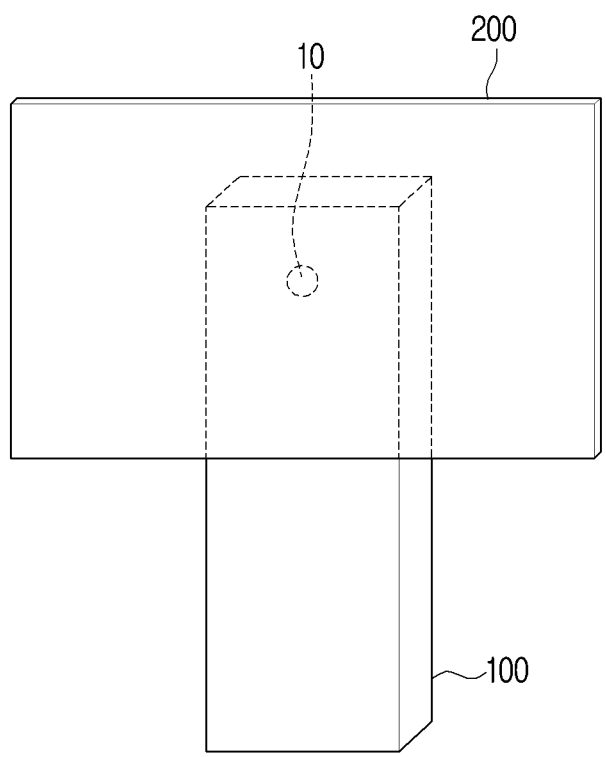
FIG. 1 is a diagram illustrating a display device and a rotating device arranged in a landscape position (or, a horizontal direction position) according to an embodiment of the disclosure.

The embodiments that will be described below are exemplary embodiments for promoting understanding of the disclosure, and it should be understood that the disclosure may be implemented while being modified in various forms, unlike the embodiments described herein. Meanwhile, in explaining the disclosure, in case it is determined that detailed explanation of related known functions or features may unnecessarily confuse the gist of the disclosure, the detailed explanation and detailed illustration thereof will be omitted. Also, in the accompanying drawings, some components may not be illustrated in their actual scales, but may be illustrated in more enlarged sizes than their actual sizes, for promoting understanding of the disclosure.

As terms used in this specification and the claims, general terms were selected in consideration of the functions described in the disclosure. However, the terms may vary depending on the intention of those skilled in the art who work in the pertinent field, or legal or technical interpretation, or emergence of new technologies, etc. Also, there are some terms that were designated by the applicant on his own, and in such cases, the meaning of the terms may be interpreted as what is defined in this specification. Meanwhile, if there is no specific definition of the terms, the meaning of the terms may be interpreted based on the overall content of this specification and technical knowledge common in the pertinent technical field.

In the description of the disclosure, the order of each step should be understood in a nonrestrictive way, unless a preceding step should necessarily be performed prior to a subsequent step in a logical and temporal sense. That is, excluding an exceptional case as above, even if a process described as a subsequent step is performed prior to a process described as a preceding step, there would be no influence on the essence of the disclosure, and the scope of the disclosure should also be defined regardless of the orders of steps.

In this specification, expressions such as "have," "may have," "include," and "may include" denote the existence of such characteristics (e.g.: elements such as numbers, functions, operations, and components), and do not exclude the existence of additional characteristics.

Terms such as "first," "second" and the like may be used to describe various components, but the components are not intended to be limited by the terms. The terms may be used only to distinguish one component from another component. For example, a first component may be called a second component, and a second component may be called a first component in a similar manner, without departing from the scope of the disclosure.

Also, in this specification, elements necessary for explanation of each embodiment of the disclosure are described, and thus elements are not necessarily limited thereto. Accordingly, some elements may be changed or omitted, or other elements may be added. Also, elements may be arranged to be dispersed in devices independent from one another.

Further, while the embodiments of the disclosure will be described in detail with reference to the following accompanying drawings and the content described in the accompanying drawings, it is not intended that the disclosure is restricted or limited by the embodiments.

Hereinafter, the disclosure will be described in detail with reference to the accompanying drawings.

Figure 2:
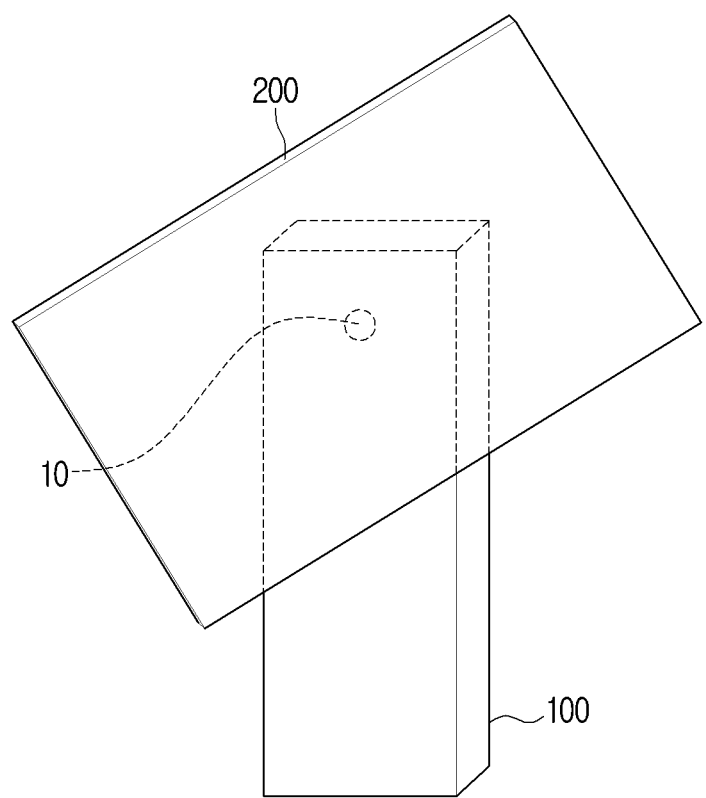
FIG. 2 is a diagram for illustrating a rotating operation of a display device according to an embodiment of the disclosure.
Figure 3:
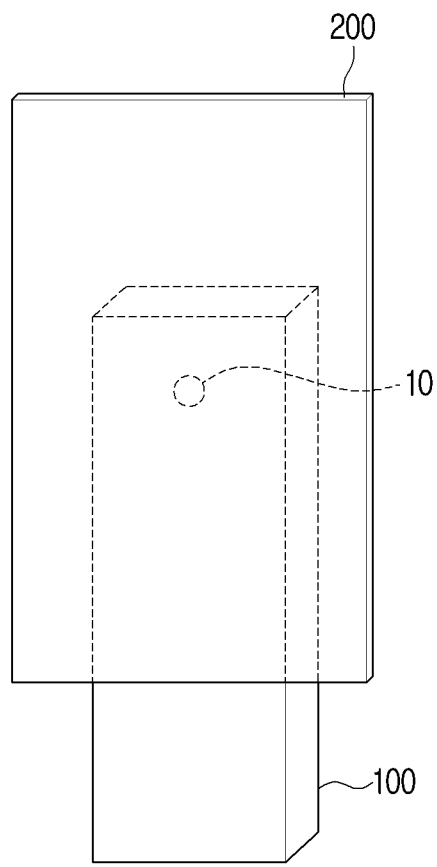
FIG. 3 is a diagram illustrating a display device and a rotating device arranged in a portrait position (or, a vertical direction position) according to an embodiment of the disclosure.

FIG. 1 to FIG. 3 are diagrams for illustrating a rotating operation of a display device 200 connected to a rotating device 100 according to an embodiment of the disclosure. The display device 200 according to an embodiment of the disclosure may be implemented as various display devices such as a TV, a smart TV, a monitor, an electronic picture frame, an electronic board, an electronic table, a laptop, a large format display (LFD), etc.

If an event for rotating the display device 200 occurs, the rotating device 100 may rotate the display device 200. Here, examples of an event for rotating the display device 200 may be a case wherein a user command for rotating the display device 200 is input, a case wherein the resolution of an image is changed, or a case wherein a user terminal device communicating with the display device 200 is rotated, etc., but are not necessarily limited thereto.

Referring to FIG. 1 to FIG. 3, the display device 200 may be detachably connected to the rotating device 100. Here, the display device 200 may be rotated based on the rotation center 10 of the rotating device 100.

According to an embodiment of the disclosure, the rotating device 100 may rotate the display device 200 in a landscape position (or a horizontal direction position) or in a portrait position (or a vertical direction position).

Here, the landscape position may be a position wherein the display device 200 is arranged in a form wherein its horizontal length is longer than the vertical length, and the portrait position may be a position wherein the display device 200 is arranged in a form wherein its vertical length is longer than the horizontal length.

For example, in a state wherein the display device 200 is in the landscape position as in FIG. 1, if a user command for rotating the display device 200 is input, the rotating device 100 may rotate the display device 200 in a counterclockwise direction.

In this case, the display device 200 may get in the portrait position illustrated in FIG. 3 through the position as in FIG. 2.

Alternatively, in a state wherein the display device 200 is in the portrait position as in FIG. 3, if a user command for rotating the display device 200 is input, the rotating device 100 may rotate the display device 200 in a clockwise direction.

In this case, the display device 200 may get in the landscape position illustrated in FIG. 1 through the position as in FIG. 2.

Meanwhile, embodiments wherein the rotating device 100 rotates the display device 200 are not limited to what are illustrated in FIG. 1 to FIG. 3. For example, the rotating device 100 may rotate the display device 200 in a clockwise direction in the landscape position and change the position to the portrait position, or rotate the display device 200 in a counterclockwise direction in the portrait position and change the position to the landscape position.

Also, in the above, an example wherein the rotating device 100 rotates the display device 200 in a clockwise direction or a counterclockwise direction by 90 degrees, and the position becomes the portrait position or the landscape position was suggested, but embodiments of the disclosure are not limited thereto. For example, the rotating device 100 may rotate the display device 200 in a counterclockwise direction or a clockwise direction by 90 degrees in the portrait position and change the position to the landscape position, and further rotate the display device 200 in the same direction by 90 degrees in the landscape position, and change the position to the portrait position.

Meanwhile, to the rotating device 100, various types of display devices 200 may be connected. For example, a user may replace a display device connected to the rotating device 100 with another display device. In this case, the rotating device 100 may change the speed of rotating the display device according to the mechanical characteristics (the size, the weight, the location of the center of gravity, etc.) of the connected display device.

In order that the rotating device 100 can perform an operation of rotating the display device 200, it should provide a torque that can rotate the display device 200 (a rotational force). A torque value that can rotate the display device 200 can be calculated through a formula as below.

$$I\theta'' + mgl \sin \theta = \tau \quad \text{[Formula 1]}$$

Here, I is the moment of inertia of the display device (a value calculated according to the shape and the weight, and the location of the center of gravity of the display device), m is the mass of the display device, g is the acceleration of gravity, l is the distance between the center (the location connected to the rotation center of the rotating device) and the center of gravity of the display device, θ is the rotation angle of the display device, and τ is the torque value of the rotating device.

Meanwhile, in case the rotating device 100 uses a step motor to provide a rotational force to the display device 200, a torque value provided to the display device 200 may vary according to the rotation speed of the motor. Specifically, as the rotation speed of the motor becomes higher, the torque value provided to the display device 200 becomes smaller (refer to the torque-speed graph in FIG. 8).

Accordingly, in consideration of the mechanical characteristics of the connected display device, in case a display device of which torque value required for rotation is big is connected, the rotating device 100 may set the rotation speed of the motor to be low and transmit a big rotational force to the display device, and in case a display device of which torque value required for rotation is small is connected, the rotating device 100 may set the rotation speed of the motor to be high and transmit a needed rotational force, and at the same time, minimize the rotation time.

A detailed content related to the operation of the rotating device 100 as above will be described with reference to the drawings below.

Figure 4:
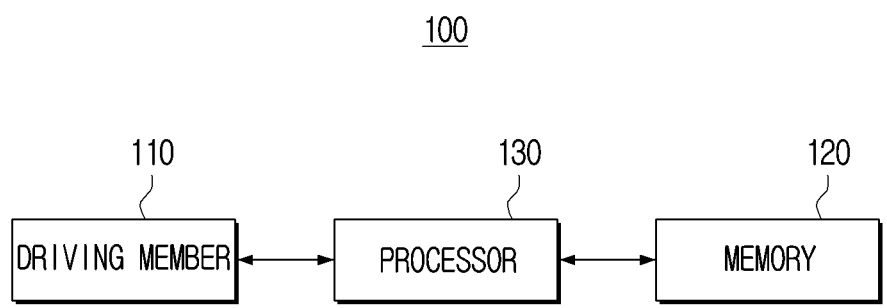
FIG. 4 is a block diagram for illustrating a configuration of a rotating device according to an embodiment of the disclosure.

FIG. 4 is a block diagram for illustrating a configuration of a rotating device according to an embodiment of the disclosure.

Referring to FIG. 4, the rotating device 100 according to an embodiment of the disclosure may include a driving member 110, a memory 120, and a processor 130.

The driving member 110 is a component that provides a driving force rotating the display device 200 mounted on the rotating device 100. The driving member 110 may include a motor generating a rotational force.

The memory 120 may store an operating system (OS) for controlling the overall operations of the components of the rotating device 100, and instructions or data related to the components of the rotating device 100.

Accordingly, the processor 130 may control a plurality of hardware or software components of the rotating device 100 by using various instructions or data, etc. stored in the memory 120, and load an instruction or data received from at least one of other components on a volatile memory and process them, and store various data in a non-volatile memory.

In particular, for rotating the display device 200 mounted on the rotating device 100, the memory 120 may store a plurality of driving information for controlling the driving member 110.

The processor 130 controls the overall operations of the rotating device 100. For this, the processor 130 may include one or more of a central processing unit (CPU), an application processor (AP), or a communication processor (CP).

The processor 130 may control hardware or software components connected to the processor 130 by operating the operation system or an application program, and perform various kinds of data processing and operations. Also, the processor 130 may load an instruction or data received from at least one of other components on a volatile memory and process them, and store various data in a non-volatile memory.

If an event for rotation of the display device 200 occurs, the processor 130 may control the driving member 110 to rotate the display device 200.

Here, a rotation event may be an event wherein a user command for rotating the display device 200 is input, an event wherein a predetermined time comes, an event wherein the resolution of an image to be displayed and the posture of the display device 200 do not correspond, etc. However, these are merely examples, and rotation events in the disclosure are not limited thereto.

Specifically, if a user command for rotating the display device 200 is received, the processor 130 may control the driving member 110 to rotate the display device 200 mounted on the rotating device 100 based on driving information corresponding to the display device 200 mounted on the rotating device 100 among a plurality of driving information stored in the memory 120.

A user command may be a command of selecting a specific button provided on the rotating device 100, the display device 200, or a remote control device (not shown), or a command of selecting a menu displayed on the display device 200, or a command of selecting a menu displayed on a user terminal such as a smartphone, etc.

Figure 5:
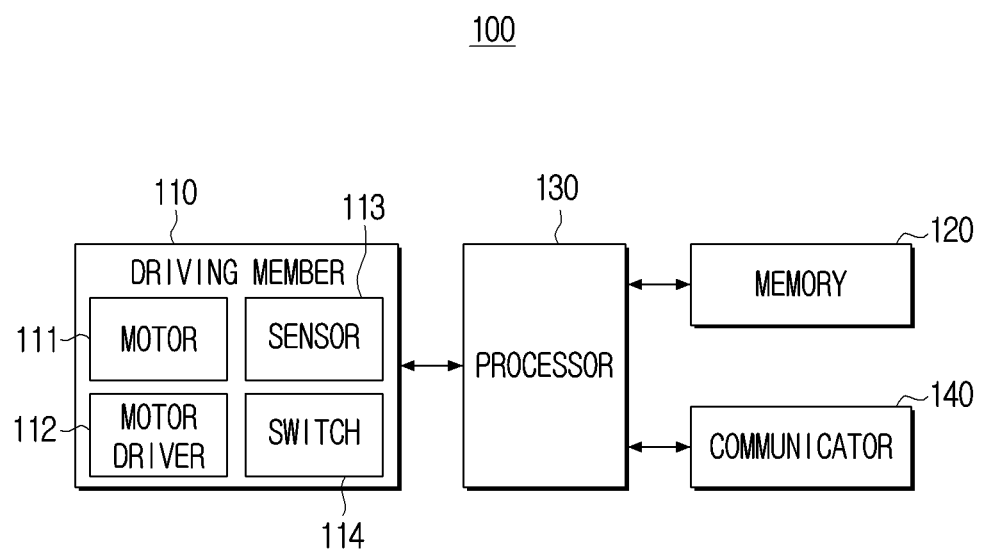
FIG. 5 is a block diagram for illustrating a detailed configuration of a rotating device according to an embodiment of the disclosure.

FIG. 5 is a block diagram for illustrating a detailed configuration of a rotating device according to an embodiment of the disclosure.

Referring to FIG. 5, the rotating device 100 according to an embodiment of the disclosure may include a driving member 110, a memory 120, a processor 130, and a communicator 140. Among the components illustrated in FIG. 5, regarding parts that overlap with the components illustrated in FIG. 4, detailed explanation will be omitted.

The driving member 110 may include a motor 111, a motor driver 112, a sensor 113, and a switch 114. Detailed explanation in this regard will be described below with reference to FIG. 7.

The communicator 140 may perform communication with an external device according to various types of communication methods, and transmit and receive various types of data.

For this, the communicator 140 may include at least one communication module of a near field wireless communication module (not shown) and a wireless LAN communication module (not shown). Here, a near field wireless communication module (not shown) is a communication module performing data communication with an electronic device located in a near distance wirelessly, and it may be, for example, a Bluetooth module, a Zigbee module, a near field communication (NFC) module, etc. Also, a wireless LAN communication module (not shown) is a module that is connected to an external network according to a wireless communication protocol such as WiFi, IEEE, etc., and performs communication.

Other than the above, the communicator 140 may further include a mobile communication module that performs communication by connecting to a mobile communication network according to various mobile communication standards such as 3rd Generation (3G), 3rd Generation Partnership Project (3GPP), Long Term Evolution (LTE), etc. Also, the communicator 140 may include at least one of a wired communication module (not shown) such as a Universal Serial Bus (USB), Institute of Electrical and Electronics Engineers (IEEE) 1394, RS-232, etc., or include a broadcasting reception module that receives TV broadcasting.

In particular, the communicator 140 may communicate with the display device 200 connected to the rotating device 100. The rotating device 100 may receive identification information for identifying the display device 200 from the display device 200 through the communicator 140.

In this case, the processor 130 may determine driving information corresponding to the display device 200 based on the received identification information. Specifically, the processor 130 may calculate a torque value (refer to Formula 1) for rotating the display device 200 based on information such as the size, the weight, the location of the center of gravity, the rotational inertia (the moment of inertia), etc. of the display device 200 included in the identification information, and determine the driving information corresponding to the display device 200 based on the calculated torque value.

For example, the processor 130 may determine the driving information corresponding to the display device 200 such that the rotation speed of rotating the display device 200 becomes lower as the calculated torque value is bigger.

Here, the driving information may include a speed profile for controlling the rotation of the motor 111 included in the driving member 110, and the processor 130 may control the rotation of the motor 111 according to the speed profile included in the driving information corresponding to the display device 200 mounted on the rotating device 100.

Meanwhile, the processor 130 may determine the driving information such that the rotating device 100 controls a torque force applied to the display device 200 by controlling the current value of a pulse signal output through the motor driver 112. For example, in case a calculated torque value rotates a relatively small display device, even if the speed profile included in the driving information is identical to the speed profile for rotating a display device having a relatively big torque value, the processor 130 may reduce the torque force applied to the display device 200 by setting the current value provided to the motor 111 through the motor driver 112 to be small.

Figure 6:
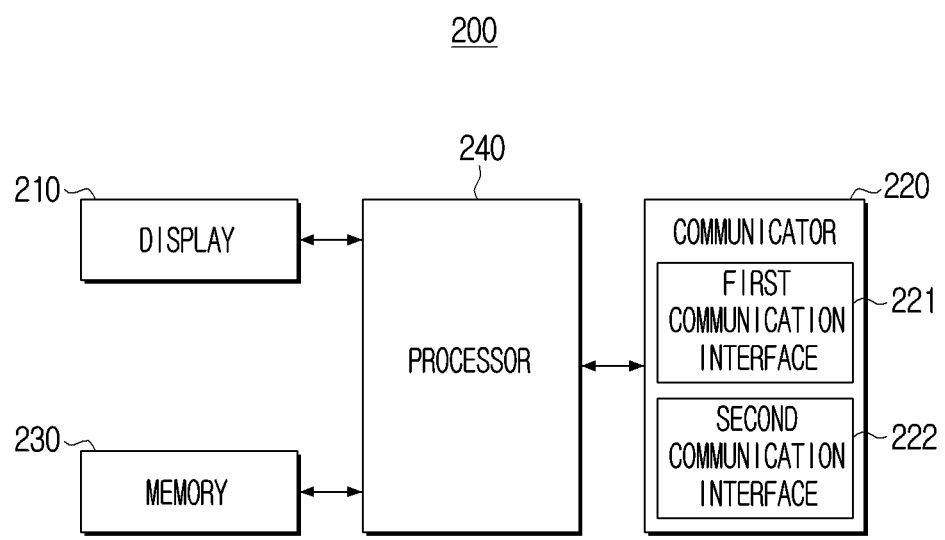
FIG. 6 is a block diagram for illustrating a configuration of a display device according to an embodiment of the disclosure.

FIG. 6 is a block diagram for illustrating a configuration of a display device according to an embodiment of the disclosure.

Referring to FIG. 6, the display device 200 may include a display 210, a communicator 220, a memory 230, and a processor 240.

The display 210 may display various images. Here, an image is a concept including at least one of a still image or a moving image, and the display 210 may display various images such as a broadcasting content, a multimedia content, etc. Also, the display 210 may display various types of user interfaces (UIs) and icons.

The display 210 may be rotated according to driving of the rotating device 100. Here, the display 210 may be rotated based on the rotation center 10 while its front surface maintains a specific direction. Here, the rotation center 10 may be located in the geometric center of the display 210, but is not necessarily limited thereto, and it may be located in another location of the display 210.

The display 210 as described above may be implemented as displays in various forms such as a Liquid Crystal Display (LCD) panel, a light emitting diode (LED), Organic Light Emitting Diodes (OLED), Liquid Crystal on Silicon (LCoS), Digital Light Processing (DLP), etc. Also, inside the display 210, driving circuits that may be implemented in forms such as an a-si TFT, a low temperature poly silicon (LTPS) TFT, an organic TFT (OTFT), etc., a backlight unit and the like may also be included together.

Also, the display 210 may be combined with a touch detector, and implemented as a touch screen.

The communicator 220 may perform communication with various electronic devices according to various types of communication methods.

In particular, the communicator 220 may include a first communication interface 221 for communicating with a remote control device (e.g., a remote control) by a first communication method, and a second communication interface 222 for communicating with the rotating device 100 by a second communication method.

For example, the display device 200 may receive a user command from a remote control device through the first communication interface 221 using an infrared communication method, and transmit the user command received through the first communication interface 221, identification information stored in the memory 230 of the display device 200, etc. to the rotating device 100 through the second communication interface 222 using a Bluetooth communication method.

As an example, a user may transmit a user command for rotating the display device 200 to the display device 200 through a remote control device for controlling the display device 200. When the user command for rotation is received through the first communication interface 221, the display device 200 may transmit the user command for rotation to the rotating device 100 through the second communication interface 222 using a Bluetooth communication method. In this case, the identification information of the display device 200 may be transmitted through the second communication interface 222 together with the user command for rotation.

The memory 230 may store an operating system (OS) for controlling the overall operations of the components of the display device 200, and instructions or data related to the components of the display device 200. In particular, the memory 230 may store the identification information of the display device 200.

The processor 240 may control the overall operations of the display device 200. In particular, the processor 240 may control the communicator 220 to transmit the identification information of the display device 200 to the rotating device 100. Specifically, if a user command for rotation of the display device is received from a remote control device through the first communication interface 221, the processor 240 may control the second communication interface 222 to transmit the identification information to the rotating device 100.

Meanwhile, the processor 240 may control the second communication interface 222 to transmit a control signal for rotating the motor 111 of the driving member 110 included in the rotating device 100 by a rotation speed corresponding to the identification information to the rotating device 100.

Meanwhile, the processor 240 may calculate a torque value for rotating the display device 200 based on information such as the size, the weight, the location of the center of gravity, the rotational inertia, etc. of the display device 200, and determine the identification information according to the calculated torque value. That is, as described above, an operation of calculating a torque value may be processed at the rotating device 100, but it may be processed at the display device 200.

The rotating device 100 and the display device 200 may respectively include a power part for being provided with power from the outside. The rotating device 100 and the display device 200 may respectively be provided with power from different external power supplies through the power parts included in them. Meanwhile, according to another embodiment, when the rotating device 100 is connected to the display device 200, it may be provided with power from the display device 200, and perform a rotating operation through the driving member 110. In this case, the rotating device 100 may be provided with power from the display device 200 by a wireless or wired method.

Figure 7:
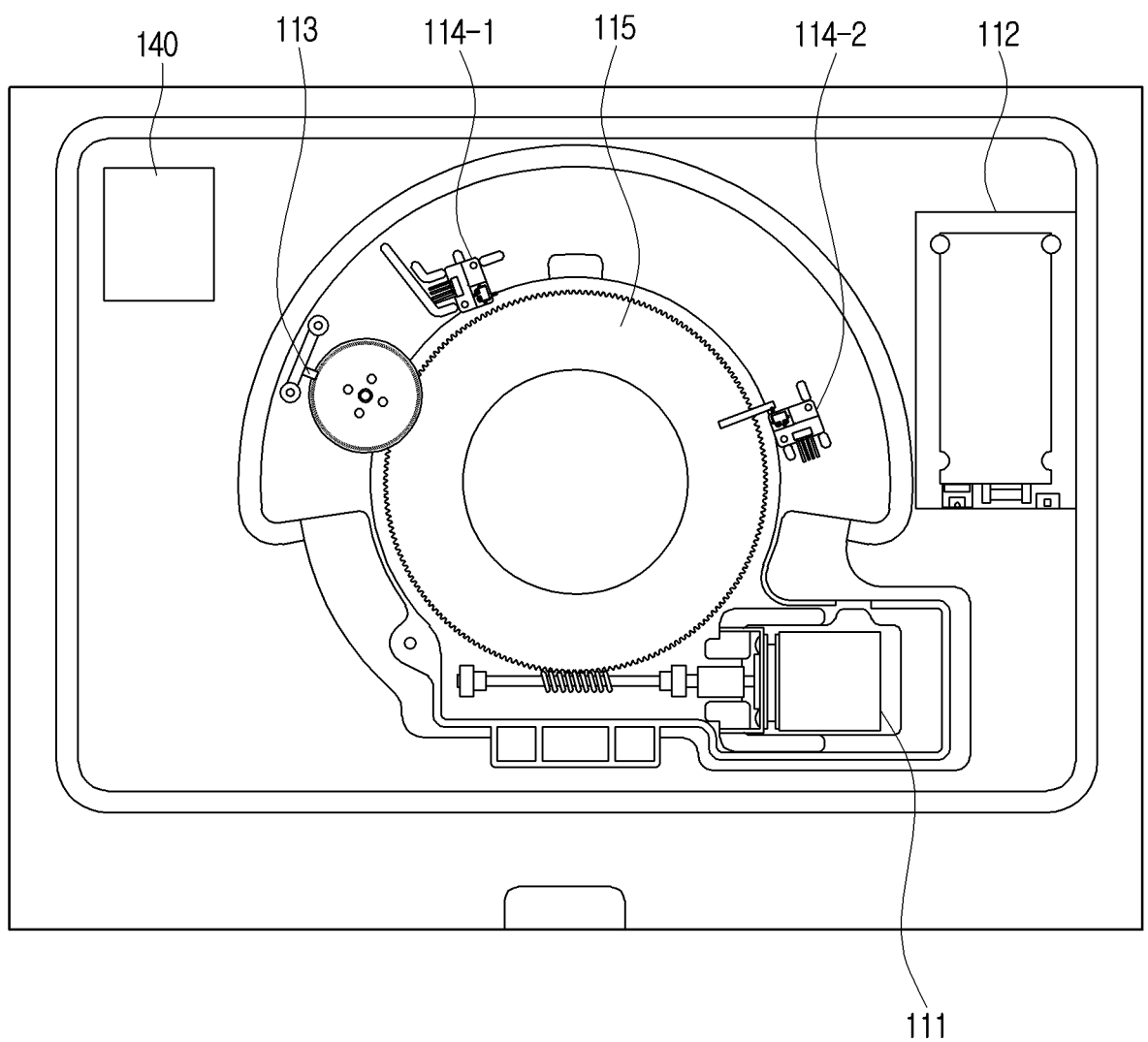
FIG. 7 is a diagram for illustrating an internal configuration of a rotating device according to an embodiment of the disclosure.

FIG. 7 is a diagram for illustrating an internal configuration of a rotating device according to an embodiment of the disclosure. Meanwhile, the configuration in FIG. 7 is merely an example, and the arrangement locations, the arrangement form, and the connected structure of the motor 111, the motor driver 112, the sensor 113, the switches 114-1, 114-2, and the communicator 140 may vary from FIG. 7 depending on embodiments. Also, although not illustrated in FIG. 7, the rotating device 100 may further include a processor 130 that is electronically connected with the motor driver 112.

The motor 111 may rotate the display device 200 according to control by the processor 130 through the motor driver 112. Specifically, referring to FIG. 7, the motor 111 may be arranged in a location that can rotate a gear 115 (e.g., a circular gear) connected with the display device 200, and may rotate the display device 200 by rotating the gear 115 according to control by the processor 130 through the motor driver 112.

The motor 111 as described above may be a step motor, as an example. In this case, the motor 111 may rotate by a specific angle based on a pulse signal output by the motor driver 112. As an example, the motor 111 may be a step motor that rotates by 1.8 degrees per pulse.

Meanwhile, the aforementioned step motor is merely an example, and the motor 111 may be implemented as various motors that can generate a rotational force. As an example, the motor 111 may be an AC motor, a DC motor, etc.

The sensor 113 may detect rotation of the display device 200. Specifically, the sensor 113 may detect rotation of the gear 115 that rotates by the motor 111, and thereby detect rotation of the display device 200 connected to the gear 115.

As an example, the sensor 113 may be implemented as an encoder (e.g., a rotary encoder). In this case, the sensor 113 may include light emitting elements (e.g., LED), a rotation disk that includes a plurality of slots, and light receiving elements (e.g., photo diodes). Also, the sensor 113 may detect rotation of the display device 200 based on a light output by the light emitting elements passing through the slots of the rotation disk and reaching the light receiving elements.

Then, the sensor 113 may output a pulse signal while the display device 200 is rotating. Specifically, while the rotation disk of the sensor 113 engaged with the gear 115 rotates as the gear 115 rotates, a light output by the light emitting elements of the sensor 113 may pass through the slots of the rotation disk and reach the light receiving elements. In this case, the sensor 113 may convert the light that reached the light receiving elements into an electronic signal, and convert the electronic signal into a pulse signal, and output the signal. For this, the sensor 113 may further include a circuit for converting an electronic signal into a pulse signal (e.g., a waveform-shaping circuit), etc.

Meanwhile, the number of pulse signals output by the sensor 113 may vary according to the resolution of the sensor 113. Here, the resolution is the number of pulse signals output by the sensor 113 when the rotation axis of the sensor 113 rotates once, and for example, if the resolution of the sensor 113 is 360, the sensor 113 may output 360 pulse signals when rotating once. Such a resolution may be diverse according to the characteristics and the specification of the sensor 113 such as the number of slots of the rotation disk of the sensor 113, etc.

Meanwhile, in the above, the sensor 113 was described as an encoder, but the sensor 113 according to the disclosure is not necessarily limited thereto. For example, the sensor 113 may be implemented as various sensors such as an infrared sensor that can detect rotation. Also, the sensor 113 may not only be implemented as the aforementioned encoder by an optical method, but it may also be implemented as an encoder by a magnetic method including a magnet and a magnetic detection sensor.

Also, in the above, it was described that the sensor 113 detects rotation of the gear 115, and thereby detects rotation of the display device 200 connected to the gear 115, but depending on embodiments, the sensor 113 may detect rotation of the display device 200 by detecting rotation of the motor 111.

The switches 114-1, 114-2 are components related to control of at least one of a rotation angle or a rotation speed of the display device 200. The switches 114-1, 114-2 according to an embodiment of the disclosure may be implemented as limit switches, but are not necessarily limited thereto. The switches may include a horizontal location detection switch 114-1 that is pushed while the display device 200 is in a portrait position, and a vertical location detection switch 114-2 that is pushed while the display device 200 is in a landscape position, and a rotation angle of the display device 200 may be detected according to a sensing value detected through each switch.

Figure 8:
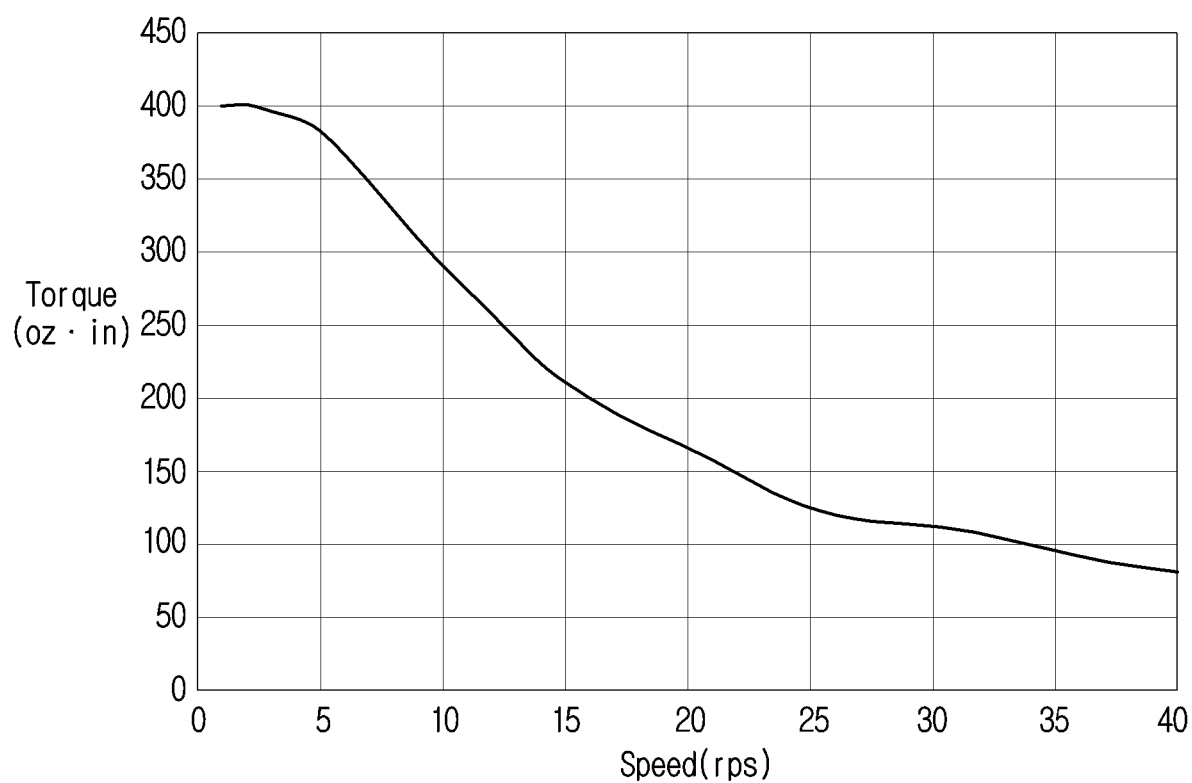
FIG. 8 is a diagram illustrating an example of a torque-speed graph of a step motor.

FIG. 8 is a diagram illustrating an example of a torque-speed graph of a step motor.

Referring to FIG. 8, it can be identified that in the case of a step motor, if the rotation speed is slow, the torque value becomes bigger, and if the rotation speed is fast, the torque value becomes smaller. In general, as the size of the display device 200 connected to the rotating device 100 becomes bigger, the rotating device 100 should provide a bigger torque for rotating the connected display device 200. Thus, the rotating device 100 may provide a rotation torque corresponding to the connected display device 200 by controlling driving of the motor 111 by a method of reducing the rotation speed of the motor 111.

Figure 9:
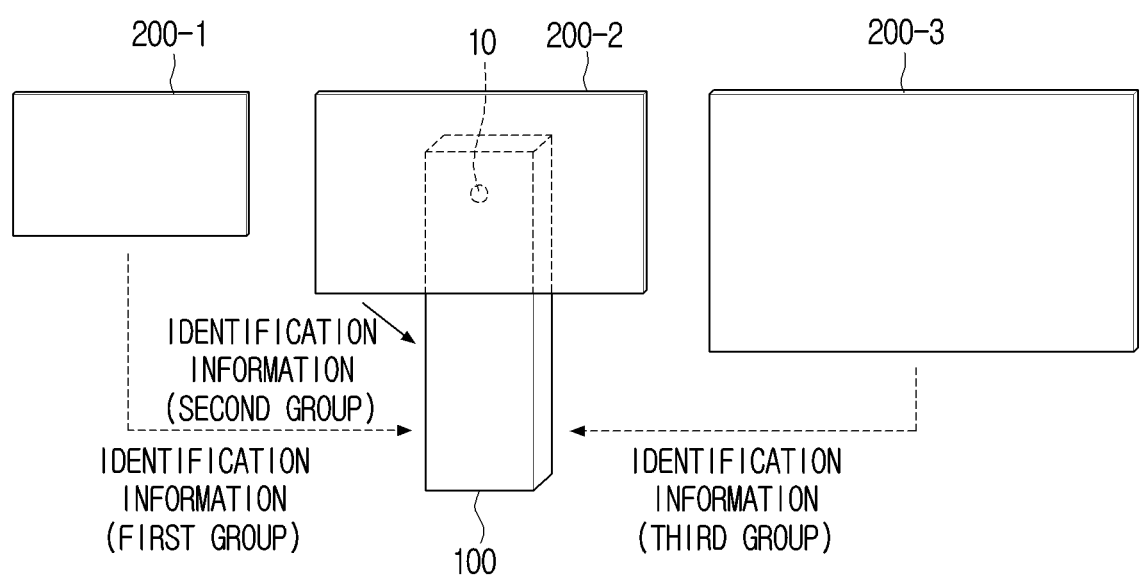
FIG. 9 is a diagram for illustrating an operation of a display device of providing identification information to a rotating device.

FIG. 9 is a diagram for illustrating an operation of a display device of providing identification information to a rotating device.

According to torque values of display devices calculated based on Formula 1, display devices may be divided into each group. For example, the display device 200-1 of which torque value is smaller than a first threshold value may be divided into a first group, the display device 200-2 of which torque value is greater than or equal to the first threshold value and smaller than a second threshold value may be divided into a second group, and the display device 200-3 of which torque value is greater than or equal to the second threshold value and smaller than a third threshold value may be divided into a third group. Identification information stored in each display device 200-1, 200-2, 200-3 may include group information for a group to which torque values for rotating each display device belong, among the plurality of groups divided according to torque values.

When the display device 200 is connected, the rotating device 100 may receive group information from the display device 200, and identify to which group the connected display device 200 belongs, and rotate the display device 200 based on driving information corresponding to the group information. Accordingly, rotation of the display device can be controlled by storing only driving information corresponding to each of the plurality of groups without storing all driving information that are matched to every display device having various sizes and weights. Thus, data can be stored effectively in a display device or a rotating device having a limited storage capacity.

Figure 10:
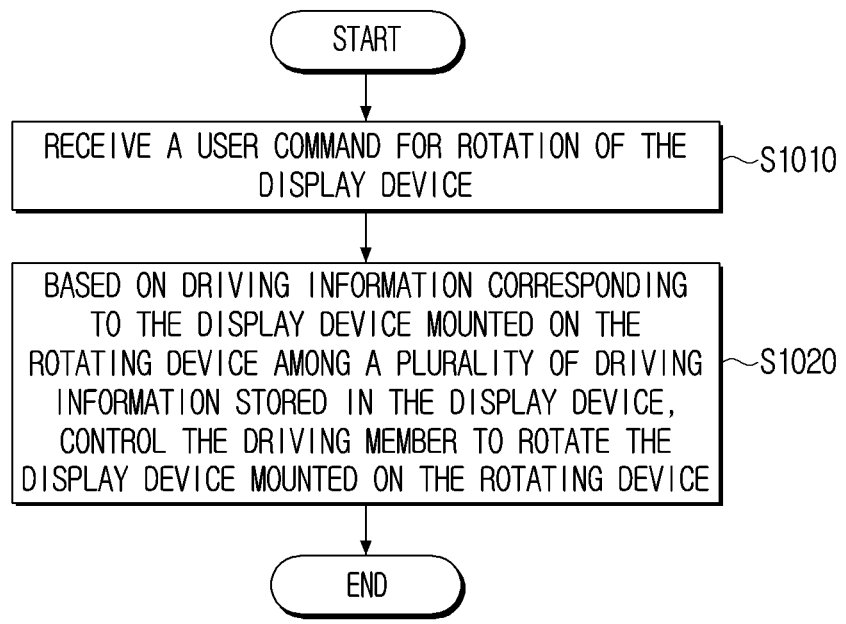
FIG. 10 is a flow chart for illustrating a control method of a rotating device according to an embodiment of the disclosure.

FIG. 10 is a flow chart for illustrating a control method of a rotating device according to an embodiment of the disclosure.

A control method of a rotating device for rotating a display device according to an embodiment of the disclosure includes the operation S1010 of receiving a user command for rotation of the display device, and the operation S1020 of controlling the driving member to rotate the display device mounted on the rotating device based on driving information corresponding to the display device mounted on the rotating device among a plurality of driving information stored in the display device.

First, the rotating device may receive a user command for rotation of the display device in operation S1010.

Then, the rotating device may control the driving member to rotate the display device mounted on the rotating device based on driving information corresponding to the display device mounted on the rotating device among a plurality of driving information stored in the display device in operation S1020.

In this case, the rotating device may receive identification information for identifying the display device from the display device. The rotating device may determine the driving information corresponding to the display device based on the received identification information.

The operation of determining the driving information may further include the operation of calculating a torque value for rotating the display device based on at least one information among the size, the weight, the location of the center of gravity, or the rotational inertia of the display device included in the identification information. In this case, the rotating device may determine the driving information corresponding to the display device based on the calculated torque value.

Also, the rotating device may determine the driving information corresponding to the display device such that the rotation speed of rotating the display device becomes lower as the torque value becomes bigger.

Meanwhile, the driving member may include a motor transmitting a rotational force to the display device, and the motor may be a step motor.

In this case, the plurality of driving information stored in the rotating device may include a speed profile for controlling the rotation of the motor, and the operation of controlling the driving member may include the operation of controlling the rotation of the motor according to the speed profile included in the driving information corresponding to the display device mounted on the rotating device.

Meanwhile, the identification information may be determined by the processor of the display device. For example, the processor of the display device may determine the identification information according to the torque value for rotating the display device calculated based on at least one information among the size, the weight, the location of the center of gravity, or the rotational inertia of the display device.

Figure 11:
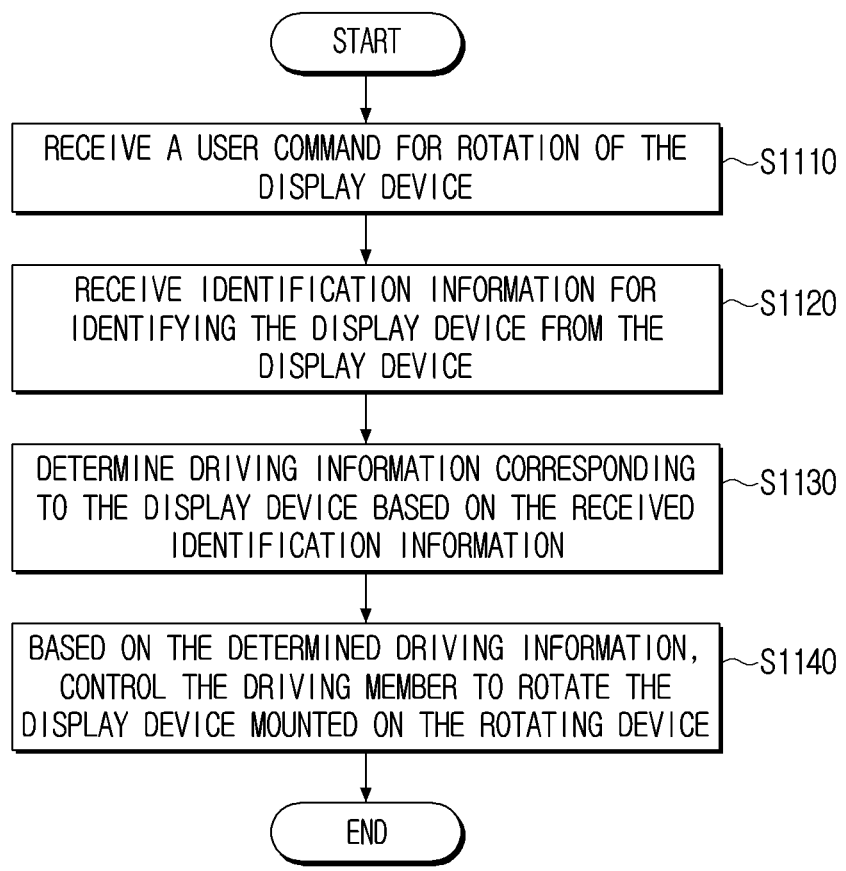
FIG. 11 is a flow chart for illustrating in detail a control method of a rotating device according to an embodiment of the disclosure.

FIG. 11 is a flow chart for illustrating in detail a control method of a rotating device according to an embodiment of the disclosure.

If a user instruction for rotation of the display device is received in operation S1110, the rotating device may receive identification information for identifying the display device from the display device in operation S1120.

Then, the rotating device may determine driving information corresponding to the display device based on the received identification information in operation S1130, and control the driving member to rotate the display device mounted on the rotating device based on the determined driving information in operation S1140.

In this case, the rotating device may identify whether there is history of pairing connection with the display device, and in case there is no history of connection, the rotating device may perform a pairing operation with the display device, and receive identification information from the display device.

The display device may perform a pairing operation by detecting mechanical connection with the rotating device. For example, the display device may include a sensor for identifying whether the display device is physically mounted on the rotating device (e.g., a proximity sensor), and identify whether the display device is mounted on the rotating device according to the result detected through the sensor. If it is identified that the display device is mounted on the rotating device according to the sensing result, the display device may initiate a pairing operation with the rotating device. Meanwhile, if it is identified that the display device is detached from the rotating device according to the sensing result, the display device may release Bluetooth connection that was connected through pairing with the rotating device.

Meanwhile, in case there is history of pairing connection with the display device, the rotating device may not perform a pairing operation again, and may determine the driving information for rotating the display device by using the identification information that was received in the process of the pairing operation that proceeded previously.

Whenever a rotation event (e.g., an event wherein a user's rotation command is received) occurs, the rotating device may receive identification information from the display device, or receive identification information only once when the display device is initially paired to the rotating device. Meanwhile, after the rotating device was paired with the display device and received identification information, the rotating device may receive identification information per predetermined period and update the identification information.

Meanwhile, computer instructions for performing processing operations at the rotating device according to the aforementioned various embodiments of the disclosure may be stored in a non-transitory computer readable medium. Computer instructions stored in such a non-transitory computer readable medium make the processing operations at the rotating device according to the aforementioned various embodiments performed by a specific machine, when the instructions are executed by the processor of the specific machine.

A non-transitory computer readable medium refers to a medium that stores data semi-permanently, and is readable by machines, but not a medium that stores data for a short moment such as a register, a cache, and a memory. Specifically, the aforementioned various applications or programs may be provided while being stored in a non-transitory computer readable medium such as a CD, a DVD, a hard disk, a blue-ray disk, a USB, a memory card, a ROM and the like.

The method according to the various embodiments may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or distributed on-line through an application store (e.g.: Play Store™). In the case of on-line distribution, at least a portion of a computer program product may be stored in a storage medium such as the server of the manufacturer, the server of the application store, and the memory of the relay server at least temporarily, or may be generated temporarily.

While preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A rotating device on which different display devices having different mechanical characteristics are mountable, the rotating device comprising:
   a driving member that is controllable to, with a respective display device of the different display devices mounted on the rotating device, rotate the display device;

a memory storing a plurality of driving information for controlling the driving member; and a processor configured to, with the respective display device of the different display devices mounted on the rotating device, receive, from the display device, identification information of the display device, determine driving information of the plurality of driving information stored in the memory that corresponds to the received identification information, and based on receiving a user command for rotating the display device, control the driving member to rotate the display device based on the determined driving information.

2. The rotating device of claim 1, further comprising:

a communicator through which the identification information is received from the display device.

3. The rotating device of claim 1, wherein the processor is configured to, with the respective display device of the different display devices mounted on the rotating device:

calculate a torque value for rotating the display device based on at least one of a size, a weight, a location of a center of gravity, and a rotational inertia, of the display device, included in the received identification information, and determine the driving information that corresponds to the received identification information based on the calculated torque value.

4. The rotating device of claim 3, wherein the processor is configured to, with the respective display device of the different display devices mounted on the rotating device:

determine the driving information that corresponds to the received identification information such that a rotation speed of rotating the display device becomes lower as the torque value becomes bigger.

5. The rotating device of claim 1, wherein the driving member includes a step motor that transmits a rotational force to the display device.

6. The rotating device of claim 5, wherein:

the determined driving information that corresponds to the received identification information includes a speed profile for controlling rotation of the step motor, and the processor is configured to, with the respective display device of the different display devices mounted on the rotating device, control the rotation of the step motor according to the speed profile included in the determined driving information.

7. The rotating device of claim 1, wherein the driving information that corresponds to the received identification information is determined according to a torque value for rotating the display device that is calculated based on at least one of a size, a weight, a location of a center of gravity, and a rotational inertia, of the display device.

8. A method of controlling a rotating device on which different display devices having different mechanical characteristics are mountable, the method comprising, by the rotating device:

controlling a driving member of the rotating device to rotate a respective display device of the different display devices mounted on the rotating device based on driving information, of a plurality of driving information stored in a memory of the rotating device, that corresponds to identification information of the display device that was received by the rotating device from the display device after the display device was mounted on the rotating device.

9. The method of claim 8, further comprising, by the rotating device:

receiving, from the display device after the display device was mounted on the rotating device, the identification information of the display device; and determining the driving information that corresponds to the received identification information.

10. The method of claim 9, wherein determining the driving information comprises:

calculating a torque value for rotating the display device based on at least one of a size, a weight, a location of a center of gravity, and a rotational inertia, of the display device, included in the received identification information, and determining the driving information that corresponds to the received identification information based on the calculated torque value.

* * * * *